US012334866B1

(12) United States Patent
Baoyin et al.

(10) Patent No.: US 12,334,866 B1
(45) Date of Patent: Jun. 17, 2025

(54) INTELLIGENT SYSTEM FOR PHOTOVOLTAIC CLEANING ROBOT

(71) Applicant: Inner Mongolia university of technology, Hohhot (CN)

(72) Inventors: Hexi Baoyin, Hohhot (CN); Wenxin Dai, Hohhot (CN); Yunfeng Gao, Hohhot (CN); Yang Yu, Hohhot (CN); Bin Cheng, Hohhot (CN); Hongtao Yang, Hohhot (CN); Jiachen Zhang, Hohhot (CN); Bitai Hu, Hohhot (CN)

(73) Assignee: Inner Mongolia university of technology, Hohhot (CN)

( * ) Notice: Subject to any disclaimer, the term of this patent is extended or adjusted under 35 U.S.C. 154(b) by 0 days.

(21) Appl. No.: 19/004,490

(22) Filed: Dec. 30, 2024

(30) Foreign Application Priority Data

Jan. 18, 2024 (CN) .......................... 202410073949.8

(51) Int. Cl.
*H02S 40/10* (2014.01)
*B08B 3/02* (2006.01)
(Continued)

(52) U.S. Cl.
CPC .............. *H02S 40/10* (2014.12); *B08B 3/024* (2013.01); *B08B 13/00* (2013.01); *G05D 1/622* (2024.01);
(Continued)

(58) Field of Classification Search
CPC ......... H02S 40/10; B08B 3/024; B08B 13/00; G05D 1/622; G05D 1/6486; G05D 1/644;
(Continued)

(56) References Cited

U.S. PATENT DOCUMENTS 7,526,100 B1 * 4/2009 Hartman .............. G06V 10/255
382/103
10,011,352 B1 * 7/2018 Dahlstrom ............. B64U 10/60
(Continued)

FOREIGN PATENT DOCUMENTS

CN 109546954 A 3/2019
CN 112183403 A 1/2021
(Continued)

OTHER PUBLICATIONS

Chen Mingshu, The Design of Infrared Unmanned Aerial Vehicle System for Intelligent Inspection of Photovoltaic Plant, Instrumentation, 2017, pp. 28-32+70, vol. 24, No. 3.
(Continued)

*Primary Examiner* — Bhavesh V Amin
(74) *Attorney, Agent, or Firm* — Bayramoglu Law Offices LLC

(57) ABSTRACT

An intelligent system for a photovoltaic cleaning robot includes: a control terminal, an intelligent control center, a stain detection database, and an intelligent device; where the intelligent device includes a camera shooting module, a motion flight module, and a cleaning module; the intelligent device and the intelligent control center are integrated on the photovoltaic cleaning robot; the intelligent control center and the control terminal are connected by a wireless communication; the intelligent control center is connected to the stain detection database through the wireless communication. In the intelligent system for the photovoltaic cleaning robot, even in a distributed photovoltaic power station with a harsh environment and terrain, it can also do the unmanned intelligent cleaning operation and maintenance work of the photovoltaic plate, where the operator only needs to operate the control terminal according to the attenuation of power generation of the power station to issue simple instructions.

2 Claims, 4 Drawing Sheets

(51) Int. Cl.
  B08B 13/00    (2006.01)
  G05D 1/622    (2024.01)
  G05D 1/644    (2024.01)
  G05D 1/648    (2024.01)
  G05D 105/10   (2024.01)
  G05D 109/20   (2024.01)
  G06T 7/00     (2017.01)

(52) U.S. Cl.
  CPC ......... *G05D 1/6486* (2024.01); *G06T 7/0002* (2013.01); *G05D 1/644* (2024.01); *G05D 2105/10* (2024.01); *G05D 2109/20* (2024.01); *G06T 2207/20081* (2013.01)

(58) Field of Classification Search
  CPC ............ G05D 2105/10; G05D 2109/20; G06T 7/0002; G06T 2207/20081
  See application file for complete search history.

(56) References Cited

U.S. PATENT DOCUMENTS

| | | | | |
|---|---|---|---|---|
| 10,046,857 | B2* | 8/2018 | Azaiz | F24S 40/20 |
| 10,518,881 | B2* | 12/2019 | Liu | B08B 1/10 |
| 10,860,115 | B1* | 12/2020 | Tran | G06F 3/0346 |
| 11,104,552 | B2* | 8/2021 | Byers | B66C 1/06 |
| 11,208,209 | B2* | 12/2021 | Liu | B08B 1/34 |
| 11,231,706 | B1* | 1/2022 | Curlander | G05D 1/0684 |
| 11,235,890 | B1* | 2/2022 | Dahlstrom | B05B 13/005 |
| 2009/0100618 | A1* | 4/2009 | Chen | E04G 23/002 |
| | | | | 15/103.5 |
| 2011/0131741 | A1* | 6/2011 | Jones | A47L 9/0494 |
| | | | | 901/1 |
| 2011/0214248 | A1* | 9/2011 | McLeod | A47L 9/0477 |
| | | | | 15/383 |
| 2012/0232690 | A1* | 9/2012 | Gilchrist | B25J 11/0095 |
| | | | | 700/228 |
| 2013/0231819 | A1* | 9/2013 | Hung | A47L 11/4011 |
| | | | | 901/1 |
| 2016/0052026 | A1* | 2/2016 | Chin | B08B 1/00 |
| | | | | 15/319 |
| 2016/0052027 | A1* | 2/2016 | Chin | B08B 1/16 |
| | | | | 15/21.1 |
| 2016/0052644 | A1* | 2/2016 | Chin | G05D 1/0094 |
| | | | | 244/17.11 |
| 2017/0090478 | A1* | 3/2017 | Blayvas | G06Q 50/40 |
| 2017/0121019 | A1* | 5/2017 | Shin | B08B 3/04 |
| 2017/0158329 | A1* | 6/2017 | Liu | B08B 7/028 |
| 2019/0008591 | A1* | 1/2019 | Desai | G06T 7/0012 |
| 2019/0047699 | A1* | 2/2019 | Bonden | H01M 10/48 |
| 2019/0068829 | A1* | 2/2019 | Van Schoyck | G01C 21/1656 |
| 2019/0068962 | A1* | 2/2019 | Van Schoyck | G06T 7/74 |
| 2019/0073912 | A1* | 3/2019 | Mellinger, III | G08G 5/57 |
| 2019/0183077 | A1* | 6/2019 | Ajamian | G05D 1/12 |
| 2019/0224843 | A1* | 7/2019 | Yang | B25J 19/02 |
| 2019/0329868 | A1* | 10/2019 | Morrison | G01C 23/00 |
| 2019/0339719 | A1* | 11/2019 | Wang | B64D 45/00 |
| 2019/0359329 | A1* | 11/2019 | Gavrilov | F24S 40/20 |
| 2019/0369641 | A1* | 12/2019 | Gillett | G05D 1/0212 |
| 2019/0389577 | A1* | 12/2019 | Jones | G05D 1/0094 |
| 2019/0392820 | A1* | 12/2019 | Chae | G06N 3/08 |
| 2020/0039427 | A1* | 2/2020 | Chen | B60Q 1/507 |
| 2020/0148351 | A1* | 5/2020 | Liu | E04G 23/002 |
| 2020/0182779 | A1* | 6/2020 | Kasten | G01N 21/39 |
| 2020/0182842 | A1* | 6/2020 | Kasten | G01N 33/0027 |
| 2020/0209891 | A1* | 7/2020 | Gusikhin | G06V 20/59 |
| 2020/0254982 | A1* | 8/2020 | Karaburun | G06Q 10/02 |
| 2020/0353511 | A1* | 11/2020 | Larsson | B25J 11/0085 |
| 2021/0018929 | A1* | 1/2021 | Choi | G05D 1/0212 |
| 2021/0200234 | A1* | 7/2021 | Song | G05D 1/0238 |
| 2022/0119111 | A1* | 4/2022 | Liu | B08B 1/10 |
| 2022/0217902 | A1* | 7/2022 | Chen | G06V 20/58 |
| 2022/0247347 | A1* | 8/2022 | Gavrilov | G05D 1/0038 |

FOREIGN PATENT DOCUMENTS

| | | |
|---|---|---|
| CN | 114612406 A | 6/2022 |
| CN | 115776274 A | 3/2023 |
| CN | 116667775 A | 8/2023 |
| EP | 4148985 A1 | 3/2023 |

OTHER PUBLICATIONS

Wenqing Liu, et al., A Method for Extracting Photovoltaic Panels from High-Resolution Optical Remote Sensing Images Guided by Prior Knowledge, Remote Sens, 2024, pp. 1-24, vol. 16, No. 9.

\* cited by examiner

INTELLIGENT SYSTEM FOR PHOTOVOLTAIC CLEANING ROBOT

CROSS REFERENCE TO THE RELATED APPLICATIONS

This application is based upon and claims priority to Chinese Patent Application No. 202410073949.8, filed on Jan. 18, 2024, the entire contents of which are incorporated herein by reference.

TECHNICAL FIELD

The present invention belongs to the technical field of photovoltaic cleaning robots, especially relates to an intelligent system for a photovoltaic cleaning robot.

BACKGROUND

Solar energy plays an important role in the long-term energy strategy as a green and sustainable energy source. The photovoltaic modules of photovoltaic power plants established in fields with complex terrain are often arranged in a distributed manner, due to various factors such as dry climate, more sandstorm, complex terrain and difficult maintenance, a large amount of dust and other coverings are often deposited on the surface of photovoltaic modules, resulting in a serious decline in power generation efficiency, furthermore, the hot spot effect of the photovoltaic panel directly damages the life of the photovoltaic module. The photovoltaic cleaning robot that realizes high-pressure washing by mounting a water tank and high-pressure water pump equipment on the unmanned aerial vehicle (UAV) platform can overcome the complex terrain to clean the photovoltaic solar panels. However, this photovoltaic cleaning robot on the commercial market still requires professional operators to control the device through the terminal, which is very inconvenient and the cleaning efficiency is low, meanwhile, the field environment is harsh and inconvenient transportation, and every cleaning involves handling the device and hiring professional operators, resulting in low timeliness of cleaning photovoltaic panels and increasing the cost of cleaning operations.

SUMMARY

An objective of the present invention is to provide an intelligent system for a photovoltaic cleaning robot, solving the problems of inconvenient operation, low cleaning efficiency, and high cleaning cost in cleaning of photovoltaic panels existing in the existing technology.

In order to achieve the above objective, the present invention provides an intelligent system for a photovoltaic cleaning robot, including a control terminal, an intelligent control center, a stain detection database and an intelligent device; the intelligent device includes a camera shooting module, a motion flight module and a cleaning module; the intelligent device and the intelligent control center are integrated on the photovoltaic cleaning robot; the intelligent control center and the control terminal are connected by a wireless communication; the intelligent control center is connected to the stain detection database through the wireless communication;

the intelligent control center receives a start instruction issued by the control terminal: when a position of a fuselage is detected to exceed a threshold of the position range of a last sleep, then return to the control terminal to determine an inspection range; if there is no latitude change, then return to the control terminal to determine whether inspected or not, if not, an automatic cleaning mode is turned on;

the intelligent control center is connected to the stain detection database in real-time, which facilitates the continuous updating and learning of machine learning algorithms to improve accuracy of detection and cleaning;

the intelligent control center is connected to the control terminal in real-time, to transmit back data and a picture of a cleaning operation, or receive instructions of the control terminal;

the intelligent control center sends execution instructions to the photovoltaic cleaning robot, and controls the photovoltaic cleaning robot to enter an intelligent cleaning mode.

Preferably, the intelligent device further includes:

an image acquisition module, the image acquisition module collects image information of the photovoltaic panel through the mounted camera shooting module; wherein the image information includes a situation of surface stains, damage or abnormality of the photovoltaic panel;

an image information processing module, the image information processing module uses machine learning technology to analyze and identify the collected image information, so as to obtain required operation instructions, identify different types of stains, estimate a severity of stains, and identify physical damage of photovoltaic panels;

a fuselage monitoring module, the fuselage monitoring module provides an obstacle avoidance function for the photovoltaic cleaning robot through a built-in sensor in the fuselage combined with the image information processing module, and monitors fuselage electric quantity and cleaning agent residual to obtain a condition instruction II;

an instruction judgment module, the instruction judgment module is used to judge a priority of each condition instruction, and an execution instruction is given through the intelligent system, including a condition comparison sub-module, which is used to judge the priority of the condition instruction; an instruction output sub-module, which outputs the execution instruction intelligently according to the priority of the condition instruction;

a control processing module, the control processing module is used to control the photovoltaic cleaning robot to execute instructions.

Preferably, the specific execution process of the intelligent cleaning mode is as follows:

S100, sending a device start instruction by the control terminal, and entering an intelligent cleaning mode for the photovoltaic cleaning robot;

S200, establishing a recognition model, and automatically inspecting and collecting photovoltaic panel position information based on the established recognition model;

S300, automatically planning a cleaning route and verifying learning according to the collected photovoltaic panel position information;

S400, storing a cleaning route to control the photovoltaic cleaning robot to perform a cleaning operation;

S500, monitoring a status of the fuselage and an operation status in real-time during an operation according to different operating stages to judge whether to return to a supply station.

Preferably, the specific process of establishing the recognition model in S200 is as follows:

S21, using lightweight GhostNet convolution calculation based on deep learning, the specific calculation formula is as follows:

$$Y' = F * f$$

$$y_{ij} = \Phi_{i,j}(y_i), i \in [1,M], j \in [1,s];$$

where, $f \in R^{M \times K \times K \times C}$ denotes M convolution kernel of K×K size in C channels, $\Phi_{i,j}$ denotes a $j^{th}$ linear calculation, which is used to generate a $j^{th}$ Ghost feature map, F denotes an input feature map, Y' denotes an output feature map processed by the convolution layer, $y_{ij}$ denotes a $j^{th}$ linear operation result of an $i^{th}$ channel feature map in Y, M denotes a number of channels, S denotes an internal parameter, and $y_i$ denotes an $i^{th}$ channel feature map in Y';

S22, using the CIoU loss function to speed up and complete the establishment of the model, the specific expression is as follows:

$$\Delta x = (x\_true - x\_pred) * \alpha;$$

$$\Delta y = (y\_true - y\_pred) * \alpha;$$

$$I = \sqrt{(W\_ture - W\_pred)^2 + (H\_ture - H\_pred)^2};$$

$$IOU = \frac{(W\_ture * H\_ture)}{(W\_pred * H\_pred)};$$

$$CIOU = 1 - IOU + \frac{\Delta x^2}{4\sigma^2} + \frac{\Delta y^2}{4\sigma^2} - \frac{\Delta x * \Delta y}{2\sigma^2};$$

in the formula, $\Delta x$ denotes a distance between a center point of a prediction box and the center point of a real box in an x direction, $\Delta y$ denotes a distance between the center point of the prediction box and the center point of the real box in a y direction, I denotes a difference in a length of a bounding box, IOU denotes an original loss function, CIOU denotes a new improved loss function, H and W are height and width of the feature map respectively, $\alpha$ is a regularization coefficient, $\sigma$ is a standard deviation of the width and length of the prediction box.

Preferably, the specific process of sending the device start instruction by the control terminal, and entering an intelligent cleaning mode for the photovoltaic cleaning robot in S100 is as follows:

S110, sending the start instruction by the control terminal;

S120, judging the fuselage position information and the instruction when returning to the terminal whether to be inspected;

S130, if the intelligent system determines a scope of inspection, then carrying out a detection of the fuselage status, an electric quantity detection, and emptying a water tank;

Preferably, judged the fuselage position information and the instruction when returning to the terminal whether to be inspected in S120 specifically includes:

S121, retrieving the stored cleaning route according to the position information when the control terminal selects not to perform inspection;

S122, manually setting an inspection range or a default inspection range of the system when the control terminal selects to perform inspection;

S123, manually setting the inspection range or the default inspection range of the system when detecting that a change in the position of the fuselage is out of a preset range.

Preferably, the specific process of automatically inspecting and collecting photovoltaic panel position information based on the established recognition model in S200 is as follows:

S210, automatically planning an inspection route according to the inspection range by the intelligent control center;

S220, identifying the photovoltaic panel and storing position information by machine learning technology and mapping to an area map according to an inspection route flight.

Preferably, the specific process of automatically planning a cleaning route and verifying learning according to the collected photovoltaic panel position information in S300 is as follows:

S310, automatically planning the cleaning route and performing a no-load flight test according to the photovoltaic panel position information;

S320, avoiding obstacles and collecting obstacle information through fuselage sensors and machine learning technology;

S330, re-planning the cleaning route according to the obstacle information and returning results to the control terminal.

Preferably, the specific process of storing a cleaning route to control the photovoltaic cleaning robot to perform a cleaning operation in S400 is as follows:

S410, starting an intelligent cleaning, and returning to the supply station for charging and adding the cleaning agent for the robot;

S420, according to the position information of the cleaning route, flying to and identifying a first photovoltaic panel of the route by the intelligent control center and the machine learning technology;

S430, automatically identifying and judging whether the photovoltaic panel needs to be cleaned according to the machine learning technology;

S431, automatically flying to a next photovoltaic panel on the cleaning route when the photovoltaic panel does not need to be cleaned, and recording a progress of the cleaning route;

S432, spraying the cleaning agent when the photovoltaic panel needs to be cleaned, judging a cleaning status of the photovoltaic panel, and flying to the next photovoltaic panel on the route to continue the cleaning operation after reaching a set cleaning standard;

S440, returning to the supply station when the cleaning is completed, and recording the progress of the cleaning route.

Preferably, the specific process of judging whether to return to the supply station in S500 is as follows:

S510, in an automatic inspection stage, detecting the status of the fuselage and an electric quantity, returning to the supply station for supply when detecting that the status of the fuselage is abnormal or the electric quantity is insufficient, and after completing the supply, automatically planning a shortest distance according to the progress of the operation route, and directly flying from the supply station to a next plate to be operated on the operation route in combination with an obstacle avoidance system;

S520, in an intelligent cleaning stage, detecting the status of the fuselage, the electric quantity and a residual quantity of the cleaning agent; returning to the supply station for supply when detecting that the status of the fuselage is abnormal or the electric quantity is insufficient; after completing the supply, automatically planning the shortest distance according to the progress of the operation route, and directly flying from the supply station to the next plate to be operated on the operation route in combination with the obstacle avoidance system.

Therefore, the present invention adopts the above-mentioned intelligent system for the photovoltaic cleaning robot, which has the following beneficial effects:

1. In this application, the operator combines the server information of the power station, which only needs to issue simple instructions on the terminal to realize the whole process of unmanned photovoltaic panel cleaning operation and maintenance work, which is convenient and quick, and ensures the timeliness of photovoltaic panel cleaning.
2. In this application, the photovoltaic cleaning robot opens the whole process of the fuselage self-monitoring module during the execution of the instruction, and monitors the operating status of the photovoltaic cleaning robot in real time to ensure the smooth and safe execution of the operation and maintenance work.
3. In this application, the photovoltaic cleaning robot is provided with a positioning system and an intelligent control system, which utilizes the machine learning technology to connect the photovoltaic panel stain detection database cloud to ensure the intelligence of the photovoltaic cleaning robot, so the unmanned intelligent operation and maintenance can be realized even the photovoltaic power station in a distributed and complex terrain, which can reduce operation and maintenance costs, and improve the operation and maintenance efficiency of photovoltaic power plants.
4. In this application, the photovoltaic cleaning robot uses machine learning technology to identify external scenes, photovoltaic panels and stains, and uses an integrated intelligent control center to plan steps and propose instructions to control robot operations, the mode saves manpower, and greatly improves the efficiency and effectiveness of photovoltaic operation and maintenance without tedious operations.
5. In this application, the photovoltaic cleaning robot will perform a positioning detection before operation and maintenance to identify whether it needs to be re-inspected, if it does not need to be inspected, it will directly start cleaning and maintenance work, operation and maintenance are carried out according to the route and coordinates stored in the system, which ensures the smooth operation and maintenance of photovoltaic panel cleaning, and the safety of the fuselage will not be affected due to errors in the new site.
6. In this application, the control terminal can issue instructions to the intelligent photovoltaic cleaning robot during the operation process or in a shutdown status, the intelligent system of the photovoltaic cleaning robot will preferentially execute the instructions issued by the terminal according to the environmental factors and the fuselage status, when it cannot be executed, it will return the reason for not executing to the terminal, which improves the convenience and safety.

Further detailed descriptions of the technical scheme of the present invention can be found in the accompanying drawings and embodiments.

DETAILED DESCRIPTION OF THE EMBODIMENTS

The following detailed description of embodiments of the present invention provided in the accompanying drawings is not intended to limit the scope of the present invention as claimed, but is merely representative of selected embodiments of the present invention. All other embodiments obtained by those of ordinary skill in the art based on the embodiments of the present invention without involving any creative effort shall fall within the scope of protection of the present invention.

Figure 1:
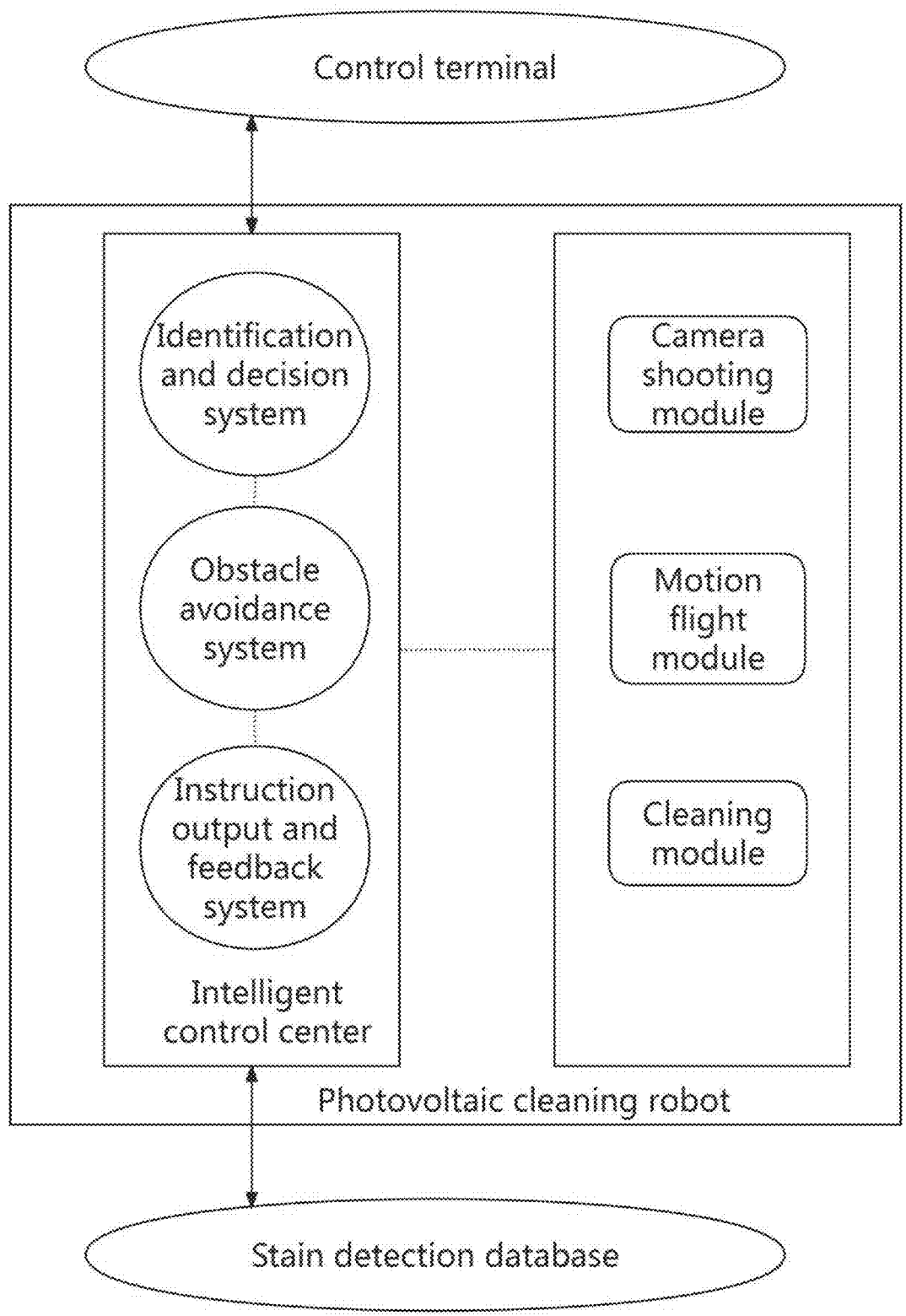
FIG. 1 is an overall block diagram of an intelligent system of a photovoltaic cleaning robot according to the present invention.
Figure 2:
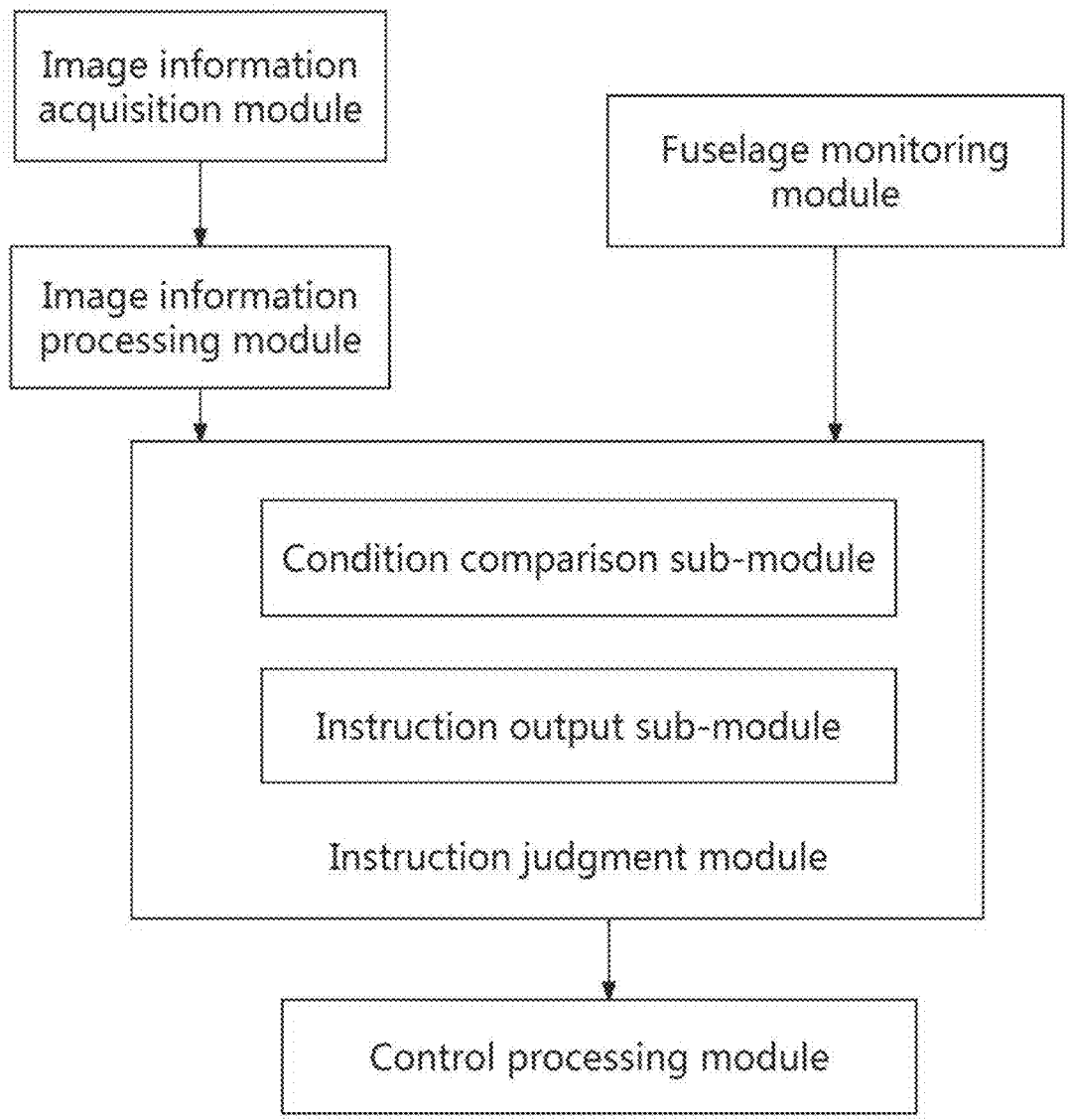
FIG. 2 is a structural block diagram of an intelligent device according to the present invention.
Figure 3:
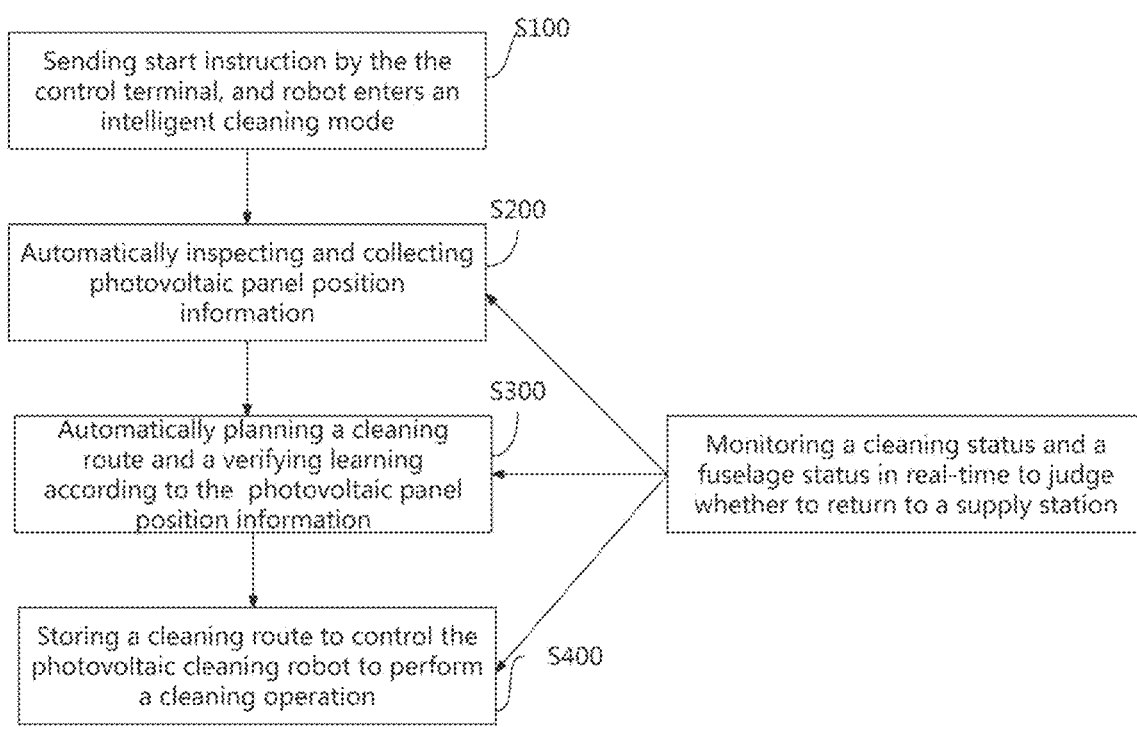
FIG. 3 is a flow block diagram of an intelligent cleaning mode according to the present invention.
Figure 4:
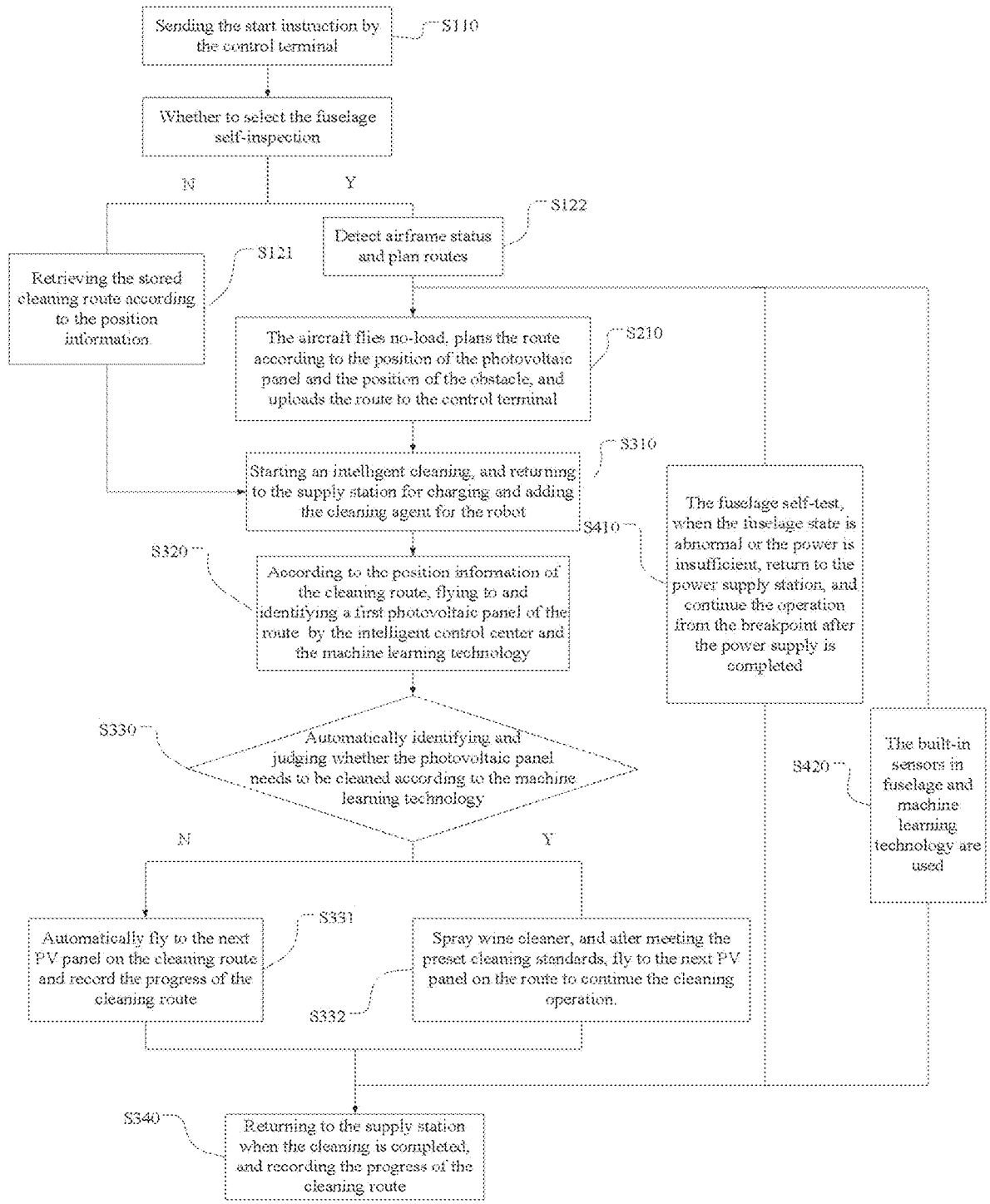
FIG. 4 is a detailed flow diagram of an intelligent cleaning mode according to the present invention.

With reference to FIGS. 1-4, an intelligent system for a photovoltaic cleaning robot, including a control terminal, an intelligent control center, a stain detection database and an intelligent device; the intelligent device includes a camera shooting module, a motion flight module and a cleaning module; the intelligent device and the intelligent control center are integrated on the photovoltaic cleaning robot; the intelligent control center and the control terminal are connected by a wireless communication; the intelligent control center is connected to the stain detection database through the wireless communication; the intelligent control center receives a start instruction issued by the control terminal: when a position of a fuselage is detected to exceed a threshold of the position range of a last sleep, then return to the control terminal to determine an inspection range; if there is no latitude change, then return to the control terminal to determine whether inspected or not, if not, an automatic cleaning mode is turned on; the intelligent control center is connected to the stain detection database in real-time, which facilitates the continuous updating and learning of machine learning algorithms to improve accuracy of detection and cleaning; the intelligent control center is connected to the control terminal in real-time, to transmit back data and picture of a cleaning operation, or receive the instructions of the control terminal; the intelligent control center sends execution instructions to the photovoltaic cleaning robot, and controls the photovoltaic cleaning robot to enter an intelligent cleaning mode.

The intelligent device further includes: an image acquisition module, the image acquisition module collects image information of the photovoltaic panel through the mounted camera shooting module, wherein the image information includes a situation of surface stains, a damage or abnormality of the photovoltaic panel, specifically, the image information acquisition module can be an imaging device that can distinguish the contour or heat source, such as a natural light camera or an infrared camera; an image information processing module, the image information processing module uses a machine learning technology to analyze and identify the collected image information, so as to obtain required operation instructions, identify different types of stains, estimate a severity of stains, and identify a physical damage of photovoltaic panels, specifically, the machine learning technology is used to connect the stain detection database, the information on the picture or video is compared and analyzed according to the details of the picture pixels, such as contour, color, etc., so as to obtain a condition instruction I of the external environment; a fuselage monitoring module, the fuselage monitoring module provides an obstacle avoidance function for the photovoltaic cleaning robot through a built-in sensor in the fuselage combined with the image information processing module, the sensor such as an acoustic sensor and a laser sensor, in order to sense the objects around the fuselage and keep a certain distance from them, and monitors fuselage electric quantity and cleaning agent residual to obtain a condition instruction II; an instruction judgment module, the instruction judgment module is used to judge a priority of each condition instruction, and an execution instruction is given through the intelligent system, including a condition comparison sub-module, which is used to judge the priority of the condition instruction; an instruction output sub-module, which outputs the execution instruction intelligently according to the priority of the condition instruction; a control processing module, the control processing module is used to control the photovoltaic cleaning robot to execute instructions.

The specific execution process of the intelligent cleaning mode is as follows:

S100, a device start instruction is sent by the control terminal, and the photovoltaic cleaning robot enters an intelligent cleaning mode; the specific process is as follows:

S110, the start instruction is sent by the control terminal;

S120, the fuselage position information and the instruction when returning to the terminal whether to be inspected are judged;

S121, the stored cleaning route is retrieved according to the position information when the control terminal selects not to perform inspection;

S122, an inspection range or a default inspection range of the system is manually set when the control terminal selects to perform inspection;

S123, the inspection range or the default inspection range of the system is manually set when detecting that a change of the position of the fuselage is out of a preset range.

S130, if the intelligent system determines a scope of inspection, then a detection of the fuselage status, an electric quantity detection, and emptying a water tank are carried out.

Specifically, when the positioning system of the robot detects that the change of the fuselage position exceeds the preset range, then the system defaults to implement the operation in the new environment, skips the control terminal to choose the option of whether to carry out the inspection, and directly opens the mandatory inspection mode, and the subsequent options that feedback to the control terminal is the setting of the inspection range, the inspection range can be set on the control terminal, or it can be directly inspected according to the default mode of the system, which improves the feasibility of the intelligent operation of the robot; when the positioning system of the robot detects that the position change of the fuselage does not exceed the preset range, the system defaults to the original environment operation, the original environment system has stored the position information of the photovoltaic panel and the cleaning route map at this time, and there are two choices under this situation, that is, the control terminal chooses to inspect or not inspect, the robot also enters the pre-work of the inspection mode when the control terminal chooses to inspect, the intelligent control center retrieves the stored photovoltaic panel position information and the cleaning route map, and directly enters the step S410 to start the cleaning operation when the control terminal chooses not to inspect, so the intelligent logic of the photovoltaic cleaning robot is improved, and the overall operation efficiency is improved.

S200, a recognition model is established, and automatically inspected and collected photovoltaic panel position information based on the established recognition model; the specific process of establishing the recognition model in S200 is as follows:

S21, a lightweight GhostNet convolution calculation is used based on deep learning, the specific calculation formula is as follows:

$$Y'=F*f'$$

$$y_{ij}=\Phi_{i,j}(y_i), i \in [1,M], j \in [1,s];$$

where, $f' \in R^{M \times K \times K \times C}$ denotes M convolution kernel of K×K size in C channels, $\Phi_{i,j}$ denotes a $j^{th}$ linear calculation, which is used to generate a $j^{th}$ Ghost feature map, F denotes an input feature map, Y denotes an output feature map processed by the convolution layer, $y_{ij}$ denotes a $j^{th}$ linear operation result of an $i^{th}$ channel feature map in Y, M denotes a number of channels, S denotes an internal parameter, and $y_i$ denotes an $i^{th}$ channel feature map in Y';

S22, the CIoU loss function is used to speed up and complete the establishment of the model, the specific expression is as follows:

$$\Delta x = (x\_true - x\_pred)*\alpha;$$

$$\Delta y = (y\_true - y\_pred)*\alpha;$$

$$l = \sqrt{(W\_ture - W\_pred)^2 + (H\_ture - H\_pred)^2};$$

$$IOU = \frac{(W\_ture * H\_ture)}{(W\_pred * H\_pred)};$$

$$CIOU = 1 - IOU + \frac{\Delta x^2}{4\sigma^2} + \frac{\Delta y^2}{4\sigma^2} - \frac{\Delta x * \Delta y}{2\sigma^2};$$

in the formula, Δx denotes a distance between a center point of a prediction box and the center point of a real box in an x direction, Δy denotes a distance between the center point of the prediction box and the center point of the real box in a y direction, I denotes a difference in a length of a bounding box, IOU denotes an original loss function, CIOU denotes a new improved loss function, H and W are height and width of the feature map respectively, α is a regularization coefficient, σ is a standard deviation of the width and length of the prediction box. The specific process of automatically inspecting and collecting photovoltaic panel position information based on the established recognition model is as follows:

S210, an inspection route is automatically planned according to the inspection range by the intelligent control center;

S220, the photovoltaic panel is identified and position information is stored by the machine learning technology and mapped to an area map according to an inspection route flight.

Specifically, the photovoltaic cleaning robot will add a camera shooting module to provide preconditions for the comparison and recognition of machine learning technology, meanwhile, during the inspection process, the intelligent control center will gradually form a large map of the inspection range in the system through the shoot of the camera shooting module, and the position information of the photovoltaic panel is mapped to the large map when the photovoltaic panel is identified. This method uses artificial intelligence machine learning technology to ensure that the robot can identify the photovoltaic panel by itself in the case of unmanned operation, and improves the efficiency of robot inspection.

S300, a cleaning route and verifying learning are automatically planned according to the collected photovoltaic panel position information; the specific process is as follows:

S310, the cleaning route is automatically planned and a no-load flight test is performed according to the photovoltaic panel position information;

S320, obstacles are avoided and obstacle information is collected through fuselage sensors and machine learning technology;

S330, the cleaning route is re-planned according to the obstacle information and returns results to the control terminal.

Specifically, when the system has planned or artificially stored the cleaning route, the intelligent control center will control the photovoltaic cleaning robot to carry out a no-load test flight according to the stored cleaning route to certify the route when this route has not been certified by the intelligent control center; if the route has been certified in the system record, the flight test certification link in S300 is skipped and directly enter the intelligent cleaning stage in S400. This improves the overall efficiency while ensuring the safe operation of the photovoltaic cleaning robot. Additionally, the flight test phase is a no-load condition, which is intended to verify the feasibility of the cleaning route, so that it can complete the verification quickly and ensure the lowest energy consumption.

S400, a cleaning route is stored to control the photovoltaic cleaning robot to perform a cleaning operation; the specific process is as follows:

S410, the intelligent cleaning is started, and the robot returns to the supply station for charging and adding the cleaning agent;

S420, according to the position information of the cleaning route, flown to and identified a first photovoltaic panel of the route by the intelligent control center and the machine learning technology;

S430, whether the photovoltaic panel needs to be cleaned is automatically identified and judged according to the machine learning technology;

S431, automatically flown to a next photovoltaic panel on the cleaning route when the photovoltaic panel does not need to be cleaned, and a progress of the cleaning route is recorded;

S432, the cleaning agent is sprayed when the photovoltaic panel needs to be cleaned, a cleaning status of the photovoltaic panel is judged, and flown to the next photovoltaic panel on the route to continue the cleaning operation after reaching a set cleaning standard;

S440, returned to the supply station when the cleaning is completed, and the progress of the cleaning route is recorded.

Specifically, when the photovoltaic cleaning robot enters the cleaning stage, firstly it will return to the supply station for the supply operation, at this time, the control terminal will display the 'supplying' and the supply status of the robot will also display; after the supply is completed, the intelligent control center will locate and identify the first photovoltaic panel according to the location information of the cleaning route, and begin to clean the photovoltaic panel in sequence, meanwhile, in the cleaning process, machine learning technology is used to identify whether the current photovoltaic panel needs to be cleaned, if it is judged that it needs to be cleaned, machine learning technology is used to identify the cleaning status of the photovoltaic panel in the cleaning process, and the robot will fly to the next photovoltaic panel to continue the operation after the cleaning standard is reached, and when the identification judged that it does not need to be cleaned, the robot will fly directly to the next photovoltaic panel, and the robot automatically returned to the supply station when the cleaning operation was completed.

Preferably, the mode can be realized through machine learning technology, which can effectively improve the operating efficiency of the photovoltaic cleaning robot, and save the consumable resources such as the cleaning agent, so as to make the cleaning work of photovoltaic panels more accurate, especially in the distributed photovoltaic power station with complex terrain such as mountain and roof, the improvement of operating efficiency and the more intelligent and accurate cleaning mode are particularly needed.

S500, a status of the fuselage and an operation status are monitored in real-time during an operation according to different operating stages to judge whether to return to a supply station; the specific process is as follows:

S510, in an automatic inspection stage, the status of the fuselage and an electric quantity are detected, returned to the supply station for supply when detecting that the status of the fuselage is abnormal or the electric quantity is insufficient, and after completing the supply, a shortest distance is automatically planned according to the progress of the operation route, and directly flown from the supply station to a next plate to be operated on the operation route in combination with an obstacle avoidance system;

S520, in an intelligent cleaning stage, the status of the fuselage, the electric quantity and a residual quantity of the cleaning agent are detected; returned to the supply station for supply when detecting that the status of the fuselage is abnormal or the electric quantity is insufficient; after completing the supply, the shortest distance is automatically planned according to the progress of the operation route, and directly flown from the supply station to the next plate to be operated on the operation route in combination with the obstacle avoidance system.

It should be noted that the built-in sensors in fuselage and machine learning technology are used in the whole stage to avoid obstacles, the obstacle avoidance system is opened in the whole stage during the flight of the robot, meanwhile, the passing standard of the fuselage status monitoring is carried out with stages, in addition, solutions should be given for different flight requirements, for example, when the photovoltaic cleaning robot is in the inspection stage, the monitoring for the cleaning agent residual is turned off, and the monitoring for the power of the robot is turned on; in the intelligent cleaning stage, the cleaning agent residual and the power of the robot are monitored at the same time, when one of the monitoring items is not up to standard, the current operating will be suspended, and the system records the progress of the operation, the robot automatically returns to the supply station, the robot starts the operation again according to the stored operation progress when the supply is completed until the cleaning operation is completed, wherein the round trip to the supply station during the operation process is carried out in a straight line after the horizontal position is raised, which saves time, meanwhile, the threshold of the monitoring item can be relatively lowered, and the efficiency can be improved under the premise of ensuring the safe operation of the robot.

Therefore, the present invention adopts the above-mentioned intelligent system for the photovoltaic cleaning robot, even in a distributed photovoltaic power station with a harsh environment and terrain, it can also do the unmanned intelligent cleaning operation and maintenance work of the photovoltaic plate, where the operator only needs to operate the control terminal according to the attenuation of the power generation of the power station to issue simple instructions, and the photovoltaic cleaning robot can carry out the whole intelligent operation and maintenance work, and the convenience is greatly improved; additionally, in this application, the integration of the use of machine learning technology and obstacle avoidance system greatly improves the rationality and safety of the logic of intelligent operation and maintenance mode, and can improve the efficiency of the photovoltaic intelligent cleaning operation.

Finally, it should be noted that the above examples are merely used for describing the technical solutions of the present invention, rather than limiting the same. Although the present invention has been described in detail with reference to the preferred examples, those of ordinary skill in the art should understand that the technical solutions of the present invention may still be modified or equivalently replaced. However, these modifications or substitutions should not make the modified technical solutions deviate from the spirit and scope of the technical solutions of the present invention.

What is claimed is:

1. An intelligent system for a photovoltaic cleaning robot, comprising a control terminal, an intelligent control center, a stain detection database, and an intelligent device; wherein the intelligent device comprises a camera shooting module, a motion flight module, and a cleaning module; the intelligent device and the intelligent control center are integrated on the photovoltaic cleaning robot; the intelligent control center and the control terminal are connected by a wireless communication; the intelligent control center is connected to the stain detection database through the wireless communication;

the intelligent control center receives a device start instruction issued by the control terminal: when a position of a fuselage is detected to exceed a threshold of a position range of a last sleep, then return to the control terminal to determine an inspection range; when there is no latitude change, then return to the control terminal to determine whether inspected or not, when the control terminal selects not to perform an inspection, an automatic cleaning mode is turned on;

the intelligent control center is connected to the stain detection database in real-time to facilitate continuous updating and learning of machine learning algorithms;

the intelligent control center is connected to the control terminal in real-time, to transmit back data and a picture of a cleaning operation, or receive instructions of the control terminal;

the intelligent control center sends execution instructions to the photovoltaic cleaning robot, and controls the photovoltaic cleaning robot to enter an intelligent cleaning mode;

a execution process of the intelligent cleaning mode comprises:

S100, sending the device start instruction by the control terminal, and entering the intelligent cleaning mode for the photovoltaic cleaning robot;

S200, establishing a recognition model, and automatically inspecting and collecting photovoltaic panel position information based on the recognition model;

S300, automatically planning a cleaning route and verifying learning according to the photovoltaic panel position information;

S400, storing the cleaning route to control the photovoltaic cleaning robot to perform the cleaning operation; and S500, monitoring a status of the fuselage and an operation status in real-time during an operation according to different operating stages to judge whether to return to a supply station;

a process of establishing the recognition model in the S200 comprises:

S21, using lightweight GhostNet convolution calculation based on deep learning, a calculation formula is as follows:

$$Y' = F * f'$$

$$y_{ij} = \Phi_{i,j}(y_i), i \in [1, M], j \in [1, s];$$

wherein, $f' \in R^{M \times K \times K \times C}$ denotes M convolution kernel of K×K size in C channels, $\Phi_{i,j}$ denotes a $j^{th}$ linear calculation and is configured to generate a $j^{th}$ Ghost feature map, F denotes an input feature map, Y denotes an output feature map processed by a convolution layer, $y_{ij}$ denotes a $j^{th}$ linear operation result of an $i^{th}$ channel feature map in Y', M denotes a number of channels, S denotes an internal parameter, and $y_i$ denotes the $i^{th}$ channel feature map in Y'; and S22, using a CIoU loss function to speed up and complete an establishment of the recognition model, and an expression is as follows:

$$\Delta x = (x\_true - x\_pred) * \alpha;$$

$$\Delta y = (y\_true - y\_pred) * \alpha;$$

$$I = \sqrt{(W\_ture - W\_pred)^2 + (H\_ture - H\_pred)^2};$$

$$IOU = \frac{(W\_ture * H\_ture)}{(W\_pred * H\_pred)};$$

$$CIOU = 1 - IOU + \frac{\Delta x^2}{4\sigma^2} + \frac{\Delta y^2}{4\sigma^2} - \frac{\Delta x * \Delta y}{2\sigma^2};$$

in the expression, $\Delta x$ denotes a distance between a center point of a prediction box and a center point of a real box in an x direction, $\Delta y$ denotes a distance between the center point of the prediction box and the center point of the real box in a y direction, I denotes a difference in a length of a bounding box, IOU denotes an original loss function, CIOU denotes a new improved loss function, H and W are a height and a width of a feature map respectively, α is a regularization coefficient, and σ is a standard deviation of a width and a length of the prediction box;

the step of sending the device start instruction by the control terminal, and entering the intelligent cleaning mode for the photovoltaic cleaning robot in the S100 comprises:
- S110, sending the device start instruction by the control terminal;
- S120, judging fuselage position information and an instruction when returning to the terminal whether to be inspected; and
- S130, when the intelligent system determines a scope of the inspection, then carrying out a detection of the status of the fuselage and an electric quantity, and emptying a water tank;

the step of judging the fuselage position information and the instruction when returning to the terminal whether to be inspected in the S120 comprises:
- S121, retrieving the cleaning route according to the fuselage position information when the control terminal selects not to perform the inspection;
- S122, manually setting the inspection range or a default inspection range of the intelligent system when the control terminal selects to perform the inspection; and
- S123, manually setting the inspection range or the default inspection range of the intelligent system when a change in the position of the fuselage is detected to be out of a preset range;

the step of automatically inspecting and collecting the photovoltaic panel position information based on the recognition model in the S200 comprises:
- S210, automatically planning an inspection route according to the inspection range by the intelligent control center; and
- S220, identifying a photovoltaic panel and storing the photovoltaic panel position information by a machine learning technology and mapping to an area map according to an inspection route flight;

the step of automatically planning the cleaning route and verifying the learning according to the photovoltaic panel position information in the S300 comprises:
- S310, automatically planning the cleaning route and performing a no-load flight test according to the photovoltaic panel position information;
- S320, avoiding obstacles and collecting obstacle information through fuselage sensors and the machine learning technology; and
- S330, re-planning the cleaning route according to the obstacle information and returning results to the control terminal;

the step of storing the cleaning route to control the photovoltaic cleaning robot to perform the cleaning operation in the S400 comprises:
- S410, starting the intelligent cleaning, and returning to the supply station for charging and adding a cleaning agent for the photovoltaic cleaning robot;
- S420, according to position information of the cleaning route, flying to and identifying a first photovoltaic panel of the cleaning route by the intelligent control center and the machine learning technology;
- S430, automatically identifying and judging whether the first photovoltaic panel needs to be cleaned according to the machine learning technology;
- S431, automatically flying to a second photovoltaic panel on the cleaning route when the first photovoltaic panel does not need to be cleaned, and recording a progress of the cleaning route;
- S432, spraying the cleaning agent when the second photovoltaic panel needs to be cleaned, judging a cleaning status of the second photovoltaic panel, and flying to a third photovoltaic panel on the cleaning route to continue the cleaning operation after reaching a set cleaning standard; and
- S440, returning to the supply station when the cleaning operation is completed, and recording the progress of the cleaning route;

the step of judging whether to return to the supply station in the S500 comprises:
- S510, in an automatic inspection stage, detecting the status of the fuselage and the electric quantity, returning to the supply station for a supply when the status of the fuselage is detected as abnormal or the electric quantity is detected as insufficient, and after completing the supply, automatically planning a shortest distance according to a progress of an operation route, and directly flying from the supply station to a next plate to be operated on the operation route in combination with an obstacle avoidance system; and
- S520, in an intelligent cleaning stage, detecting the status of the fuselage, the electric quantity, and a residual quantity of the cleaning agent; returning to the supply station for the supply when the status of the fuselage is detected as abnormal or the electric quantity is detected as insufficient; after completing the supply, automatically planning the shortest distance according to the progress of the operation route, and directly flying from the supply station to the next plate to be operated on the operation route in combination with the obstacle avoidance system.

2. The intelligent system for the photovoltaic cleaning robot according to claim 1, wherein the intelligent device further comprises:
- an image acquisition module, wherein the image acquisition module collects image information of the photovoltaic panel through a mounted camera shooting module; and the image information comprises a situation of surface stains, a physical damage, or an abnormality of the photovoltaic panel;
- an image information processing module, wherein the image information processing module uses the machine learning technology to analyze and identify the image information, to obtain required operation instructions, identify different types of the surface stains, estimate a severity of the surface stains, and identify the physical damage of the photovoltaic panel;
- a fuselage monitoring module, wherein the fuselage monitoring module provides an obstacle avoidance function for the photovoltaic cleaning robot through a built-in sensor in the fuselage combined with the image information processing module, and monitors the electric quantity of the fuselage and a cleaning agent residual to obtain a condition instruction;
- an instruction judgment module, wherein the instruction judgment module is configured to judge a priority of each condition instruction, and an execution instruction is given through the intelligent system; and the instruction judgment module comprises a condition comparison sub-module and an instruction output sub-module, wherein the condition comparison sub-module is configured to judge the priority of the condition instruction, and the instruction output sub-module outputs the execution instruction intelligently according to the priority of the condition instruction; and a control processing module, wherein the control processing module is configured to control the photovoltaic cleaning robot to execute instructions.

* * * * *